US007969280B2

(12) United States Patent
Slevin

(10) Patent No.: US 7,969,280 B2
(45) Date of Patent: Jun. 28, 2011

(54) BIOMETRIC UNIVERSAL SECURITY REMOTE

(76) Inventor: Richard S. Slevin, Los Altos, CA (US)

( * ) Notice: Subject to any disclaimer, the term of this patent is extended or adjusted under 35 U.S.C. 154(b) by 1082 days.

(21) Appl. No.: 11/747,329

(22) Filed: May 11, 2007

(65) Prior Publication Data

US 2008/0278283 A1 Nov. 13, 2008

(51) Int. Cl.
*G05B 19/00* (2006.01)
*G06F 7/00* (2006.01)
*G08B 13/00* (2006.01)
*H04B 1/00* (2006.01)
*H04Q 1/00* (2006.01)

(52) U.S. Cl. .................. 340/5.31; 340/12.5; 340/13.24; 340/5.1; 340/5.25; 340/12.23

(58) Field of Classification Search ............ 340/825.69, 340/825.72, 5.31, 5.1, 5.25; 382/115; 348/565; 345/173
See application file for complete search history.

(56) References Cited

U.S. PATENT DOCUMENTS 5,854,594 A * 12/1998 Lin et al. .................. 340/825.72
5,990,803 A * 11/1999 Park ............................ 340/5.53
6,041,410 A * 3/2000 Hsu et al. ...................... 713/186
6,791,449 B2 * 9/2004 Dewan ......................... 340/5.25
6,850,147 B2 * 2/2005 Prokoski et al. ............. 340/5.53
6,992,562 B2 * 1/2006 Fuks et al. ................... 340/5.52
7,747,867 B2 * 6/2010 Yim et al. ..................... 713/182
2002/0109580 A1 * 8/2002 Shreve et al. ................ 340/5.61

* cited by examiner

*Primary Examiner* — Nam V Nguyen
(74) *Attorney, Agent, or Firm* — Michael E. Woods

(57) ABSTRACT

An apparatus and method for a universal wireless security device that provides multiple access control functions in one device without subjecting an owner to increased risk arising from unauthorized use. Authorization is established via one or more biometric characteristics of a user attempting to operate the device. The apparatus includes a transmitter for wirelessly communicating an active security code to a security code receiver, the transmitter responsive to a mode signal to transmit a particular one of a set of a plurality of prerecorded security codes as the active security code; a biometric sensor for extracting a biometric characteristic from a user; an actuating system for indicating a particular one security transmission mode of a plurality of security transmission modes; and a controller, coupled to the transmitter, the sensor, and the actuating system, for determining when the user is an authorized user responsive to the biometric characteristic, the controller communicating the mode signal to the transmitter responsive to the particular one security transmission mode when the user is determined to be the authorized user.

3 Claims, 3 Drawing Sheets

BIOMETRIC UNIVERSAL SECURITY REMOTE

CROSS REFERENCE TO RELATED APPLICATIONS

This application is related to U.S. patent application Ser. No. 11/309,677 filed 11 Sep. 2006 entitled Biometric Padlock and U.S. patent application Ser. No. 11/309,676 filed 11 Sep. 2006 entitled Biometric Cabinet Lock, the disclosures of both are hereby expressly incorporated by reference herein for all purposes.

BACKGROUND OF THE INVENTION

The present invention relates generally to security transmitters, and more specifically to portable wireless transmitters for accessing spaces (e.g., homes and garages and secure spaces within those spaces) and accessing/operating equipment (e.g., automobiles).

It is known to use portable wireless transmitters (e.g., remotes) to control security of portals and equipment. These devices may take the form of garage door openers, front door/alarm security on home security systems, and vehicle door/alarm controls.

These existing systems have at least two drawbacks, including that each system typically is provided with a separate controller and each controller is typically unable to determine whether any given operator is authorized. Thus any person operating any of these systems is permitted to enter/disarm the secured premises/equipment. This second drawback inhibits design and development of a "universal" controller because loss/pilferage of the universal controller would be a significant security concern as all protected/secured premises/equipment would be vulnerable to unauthorized access/use.

What is needed is a universal wireless security device that provides multiple access control functions in one device without subjecting an owner to increased risk arising from unauthorized use.

The preferred embodiments of the present invention provide a solution that permits biometric solutions to be used in to qualify operation of a wireless portable security device, such as a universal remote control for multiple different security systems.

The novel features which are characteristic of the invention, as to organization and method of operation, together with further objects and advantages thereof, will be better understood from the following description considered in connection with the accompanying drawings in which one or more preferred embodiments of the invention are illustrated by way of example. It is to be expressly understood, however, that the drawings are for the purpose of illustration and description only and are not intended as a definition of the limits of the invention. These drawings include the following figures, with like numerals indicating like parts.

BRIEF SUMMARY OF THE INVENTION

Disclosed is an apparatus and method for a universal wireless security device that provides multiple access control functions in one device without subjecting an owner to increased risk arising from unauthorized use. Authorization is established via one or more biometric characteristics of a user attempting to operate the device. The apparatus includes a transmitter for wirelessly communicating an active security code to a security code receiver, the transmitter responsive to a mode signal to transmit a particular one of a set of a plurality of prerecorded security codes as the active security code; a biometric sensor for extracting a biometric characteristic from a user; an actuating system for indicating a particular one security transmission mode of a plurality of security transmission modes; and a controller, coupled to the transmitter, the sensor, and the actuating system, for determining when the user is an authorized user responsive to the biometric characteristic, the controller communicating the mode signal to the transmitter responsive to the particular one security transmission mode when the user is determined to be the authorized user.

The method includes a) qualifying an operator of a portable security device as an authorized user using a biometric characteristic of said user supplied by a biometric sensor coupled to said portable security device; and b) responding to an actuation of an actuating system including a plurality of actuation controls of said portable security device to transmit a particular one of a plurality of prerecorded security codes, one prerecorded security code associated with each of said actuation controls only when said operator is an authorized user.

The preferred embodiments of the present invention provide a solution that permits biometric solutions to be used in to qualify operation of a wireless portable security device, such as a universal remote control for multiple different security systems.

DETAILED DESCRIPTION OF THE INVENTION

The present invention relates to a biometric locking system, method, and computer program product that offers the benefits of biometric security to existing enclosure systems while permitting preservation of most aspects of the existing enclosure designs. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
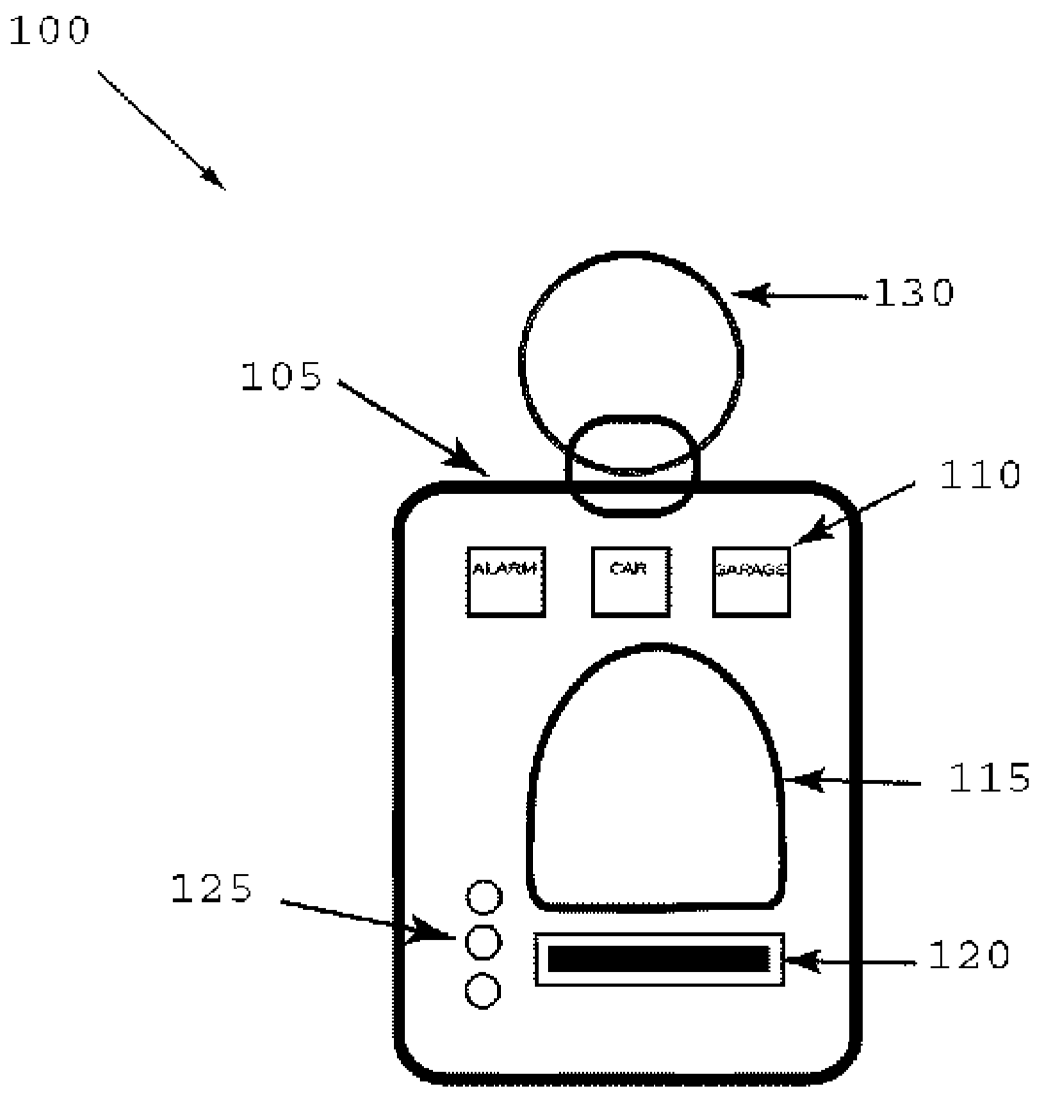
FIG. 1 is a system diagram of a portable security device.

FIG. 1 is a system diagram of a portable security device 100. Device 100 includes a portable housing 105 containing a controller and wireless transmitter coupled to an actuating system 110 and a biometric system. The biometric system shown for discussion purposes includes a swipe sensor 115 for imaging a fingerprint of an operator and a finger guide 120 for locating and guiding the finger when imaging a fingerprint. An interface 125 is provided that provides user feedback on features and training and are specific to the type biometric system used. The related U.S. patent application Ser. No. 11/309,677 incorporated by reference includes a description of one type of biometric interface that may be used with the present invention. Housing 105 includes, for this implementation, a key ring 130 that may be used to hold keys and other similar items.

Actuating system 110 includes, in the illustrated implementation, three actuator buttons. Each button is associated with a prerecorded security code, and operation of one of the actuator buttons will cause, when the operator is an authorized user, the controller to cause the transmitter to issue the appropriate prerecorded security code. Security codes include unencrypted and encrypted signals adapted to activate a receiver to control a protected space, equipment, or other security feature. For example, security codes may be used to control a home alarm system, a garage door opener, a safe, a vehicle alarm system, and/or a vehicle door lock, and the like. It is known to provide wireless remotes for many of these functions, but they have not heretofore been combined into a single secure portable remote. Actuator system 110 does not require actuator buttons as other interface options are possible.

The biometric system enhances the security of the portable universal security device by transmitting appropriate protected prerecorded security codes only when the operator is an authorized user. The biometric system determines one or more biometric characteristics or parameters of the operator and qualifies the user against a database. The qualification may be an identification of a particular authorized user or simply qualification that the operator is one of a group of authorized users. When an operator actuates a particular one actuator button of actuator system 110, device 100 must have been put into the transmission authorized mode by having the operator successfully match a biometric test. In some instances, different authorized users may have different prerecorded security codes associated with the same actuator button. Other biometric sensors may be used in addition to, or in lieu of, fingerprint swipe sensor 115.

Figure 2:
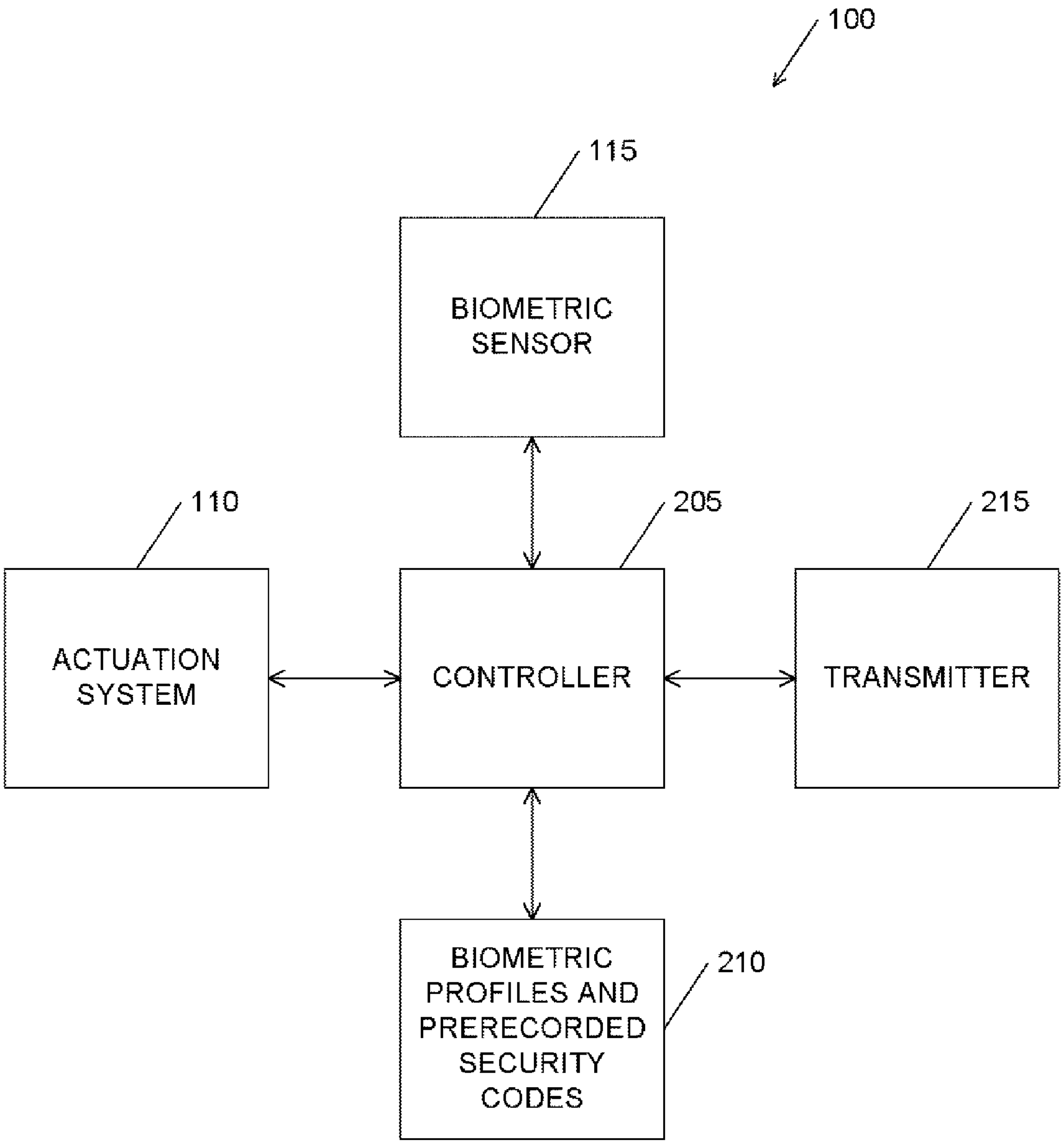
FIG. 2 is a schematic block diagram of a portable security device.

FIG. 2 is a schematic block diagram of portable security device 100 shown in FIG. 1. In addition to actuation system 110 and biometric sensor 115 shown in FIG. 1, device 100 includes a controller 205, a database 210, and a transmitter 215. Controller 205 is coupled to each of the components. Controller 205 may be a suitable microcontroller including non-volatile memory, a power source (e.g., a battery) and processor for executing machine instructions to implement the desired functions and features of the specific application.

Database 210 is a nonvolatile memory for storing biometric profiles of authorized users and prerecorded security codes for the particular systems with which device 100 interacts. Database 210 is used in this context in a broad meaning of storing data that may be retrieved and in some cases is closely synonymous with memory or non-volatile storage.

Transmitter 215 is a wireless communication device appropriate for the type of security codes to be transmitted. For example transmitter 215 may be an infrared transmitter, a radiofrequency transmitter, an ultrasonic transmitter, a combination, or the like.

An operator qualifies herself by using biometric sensor 115 and having controller 205 establish a suitable match based upon appropriate threshold comparison and processing with biometric profiles stored in database 210. After qualification, the authorized user operates actuation system 110 to indicate a particular one modality for device 100. Modality herein refers to operation of device 100 in one of its modes to control a specific one or predetermined collection of security receivers. Controller 205, responsive to the selected modality, retrieves the desired prerecorded security code and causes transmitter 215 to wirelessly issue the appropriate code.

For example, device 100 shown in FIG. 1 includes three actuation buttons as part of actuation system 110 (some devices 100 will include fewer or more actuation elements). These buttons correspond to, as way of example, a home alarm system, a car security system, and a garage door. Each of the actuation buttons corresponds to a modality of device 100, transforming the universality of device 100 into a specific remote controller for the desired function. Thus device 100 of this example combines the functions of a home remote control, a car alarm, and a garage door opener all in a single device.

Figure 3:
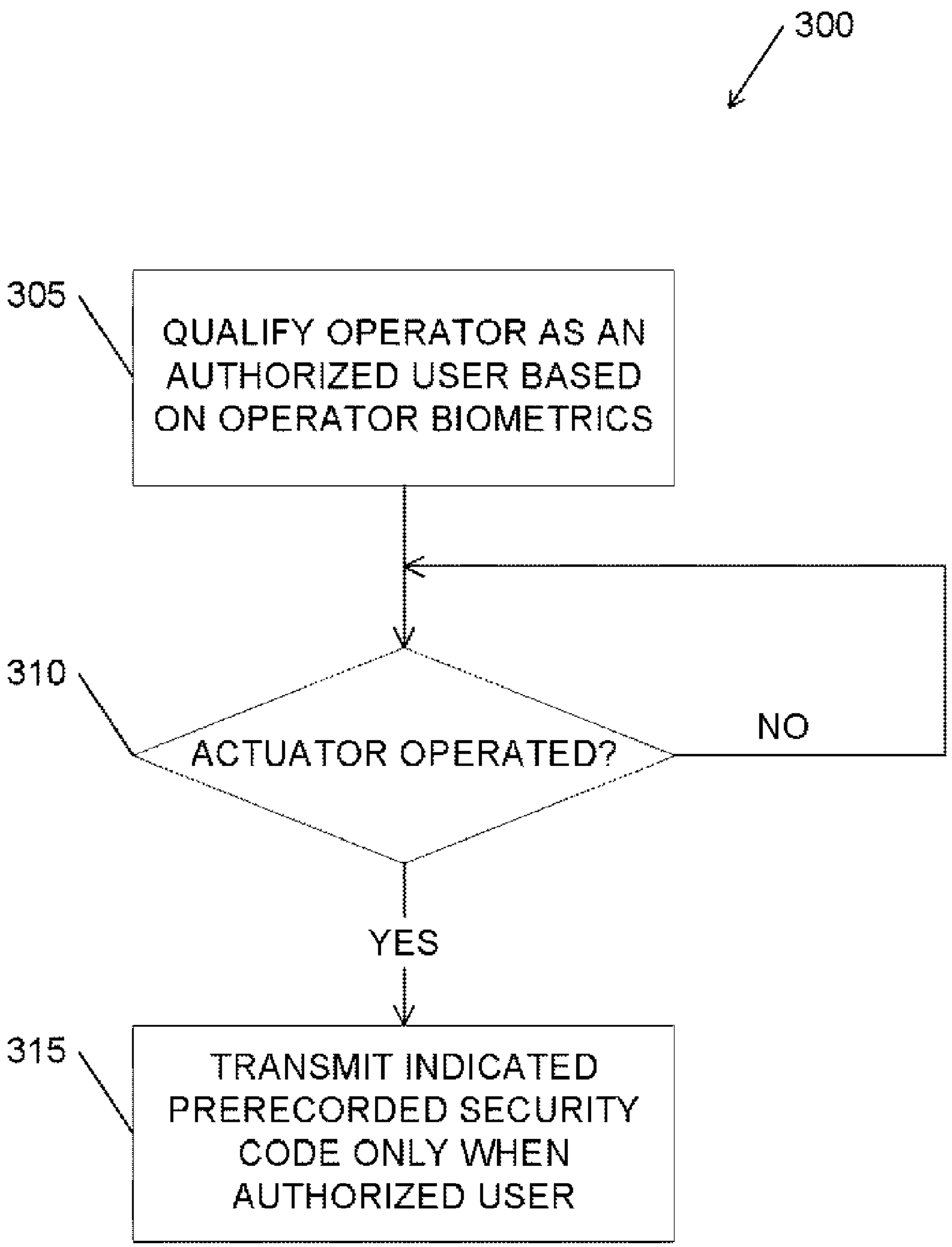
FIG. 3 is a flowchart illustrating a transmission process.

FIG. 3 is a flowchart illustrating a secure transmission process 300, such as implemented by device 100 shown in FIG. 1 and FIG. 2. Process 300 includes a first component 305: qualify an operator as an authorized user using operator biometrics. After first component 305, process 300 includes a second component 310 which tests for actuation of actuator system 110. Component 310 may be implemented in different ways—interrupt driven or periodic check or the like, or in some cases controller 205 uses a state machine to establish a qualification status and a period of time for validity of the qualification status. After a successful test, controller 205 maintains the positive qualification status for a predetermined time pending another qualification event and/or actuation. Some implementations may have the qualification status continue past actuation while other implementations may reset the qualification status after actuation, while others may have a hybrid or even some other qualification process. Thus component 310 is represented as a test (though it may be functionally implemented in equivalent ways) for a positive actuation during a positive qualification state. When no actuation is present during the positive qualification state, no valid transmission occurs (just as no valid transmission occurs when an unqualified operator uses actuation system 110). Note that in some implementation, an operator may successfully qualify the system and permit a non-qualified user to operate the device. In which case the operator becomes a temporary authorized user that has inherited the qualification state from an authorized user.

When the test identified by component 310 is true (yes actuator system 110 was operated), then process 300 advances to a component 315. Component 315 transmits an indicated (by an actuation signal from actuator system 110) prerecorded security code—but only when device 100 is in the positive qualification state.

Although embodiments of the invention have been described primarily with respect to a fingerprint verification system, any type of fingerprint analysis system may benefit from features of the invention. Other image comparison/processing products such as, for example, retinal scans and machine vision and other locking systems, and the like, may similarly benefit from features of the invention.

The biometrics system, method, computer program product, and propagated signal described in this application may, of course, be embodied in hardware; e.g., within or coupled to a Central Processing Unit ("CPU"), microprocessor, microcontroller, System on Chip ("SOC"), or any other programmable device. Additionally, the biometrics system, method, computer program product, and propagated signal may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. A biometrics system, method, computer program product, and propagated signal embodied in software may be included in a semiconductor intellectual property core (e.g., embodied in HDL) and transformed to hardware in the production of integrated circuits. Additionally, a biometrics system, method, computer program product, and propagated signal as described herein may be embodied as a combination of hardware and software.

One of the preferred implementations of the present invention is as a routine in an operating system made up of programming steps or instructions resident in a memory of a computing system shown in FIG. 2, during computer operations. Until required by the computer system, the program instructions may be stored in another readable medium, e.g. in a disk drive, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, C#, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits may be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Therefore the scope of the invention is to be determined solely by the appended claims.

What is claimed as new and desired to be protected by Letters Patent of the United States is:

1. A portable security apparatus, comprising:

a transmitter for wirelessly communicating an active security code to a security code receiver, said transmitter responsive to a mode signal to transmit a particular one of a set of a plurality of prerecorded security codes as said active security code;

a biometric sensor for extracting a biometric characteristic from a user;

an actuating system for indicating a particular one security transmission mode of a plurality of security transmission modes; and a controller, coupled to said transmitter, said sensor, and said actuating system, for determining when said user is an authorized user responsive to said biometric characteristic, said controller communicating said mode signal to said transmitter responsive to said particular one security transmission mode when said user is determined to be said authorized user, wherein said set of a plurality of prerecorded security codes is associated with a first user and wherein the portable security apparatus further includes a second set of a plurality of prerecorded security codes associated with a second user, said first set and said second set including at least one different prerecorded security code and wherein said controller determines which set to associate with said actuator system responsive to said biometric characteristic.

2. A method, the method comprising:

a) qualifying an operator of a portable security device as an authorized user using a biometric characteristic of said user supplied by a biometric sensor coupled to said portable security device; and b) responding to an actuation of an actuating system including a plurality of actuation controls of said portable security device to transmit a particular one of a plurality of prerecorded security codes, one prerecorded security code associated with each of said actuation controls only when said operator is an authorized user, wherein said plurality of prerecorded security codes is a first set of prerecorded security codes and is associated with a first user and further including a second set of a plurality of prerecorded security codes associated with a second user, said first set and said second set including at least one different prerecorded security code and wherein said responding step determines which set to associate with said actuator system responsive to said biometric characteristic.

3. A portable security apparatus, comprising:

a transmitter for wirelessly communicating an active security code to a security code receiver, said transmitter responsive to a mode signal to transmit a particular one of a set of a plurality of prerecorded security codes as said active security code;

a biometric sensor for extracting a biometric characteristic from a user;

an actuating system for indicating a particular one security transmission mode of a plurality of security transmission modes; and a controller, coupled to said transmitter, said sensor, and said actuating system, for determining when said user is an authorized user responsive to said biometric characteristic and setting a transmission authorized mode as TRUE when said user is authorized to transmit, said controller communicating said mode signal to said transmitter responsive to said particular one security transmission mode when said user is determined to be said authorized user only when said transmission authorized mode is TRUE, wherein said set of a plurality of prerecorded security codes is associated with a first user and wherein the portable security apparatus further includes a second set of a plurality of prerecorded security codes associated with a second user, said first set and said second set including at least one different prerecorded security code and wherein said controller determines which set to associate with said actuator system responsive to said biometric characteristic.

* * * * *